United States Patent
Motogami et al.

Patent Number: 5,116,541
Date of Patent: May 26, 1992

[54] ION-CONDUCTIVE POLYMER ELECTROLYTE

[75] Inventors: Kenji Motogami, Takatsuki; Shigeo Mori, Kyoto, all of Japan

[73] Assignee: Dai-Ichi Kogyo Seiyaku Co., Ltd., Kyoto, Japan

[21] Appl. No.: 507,143

[22] Filed: Apr. 10, 1990

[30] Foreign Application Priority Data

Apr. 13, 1989 [JP] Japan .................. 1-93763
Oct. 26, 1989 [JP] Japan .................. 1-280723

[51] Int. Cl.⁵ .......................... H01B 1/06; H01M 6/18
[52] U.S. Cl. ................................ 252/518; 252/521; 252/500; 252/512; 252/62.2; 429/192
[58] Field of Search ............. 252/512, 518, 62.2, 252/500, 521; 429/192

[56] References Cited

U.S. PATENT DOCUMENTS 4,620,944 11/1986 Armand et al. .............. 252/518
5,051,211 9/1991 Ward et al. .................. 252/518

Primary Examiner—A. Lionel Clingman
Assistant Examiner—Bradley A. Swope
Attorney, Agent, or Firm—Morgan & Finnegan

[57] ABSTRACT

An ion-conductive polymer electrolyte comprises an organic polymer and a soluble electrolyte salt. The organic polymer is obtained by crosslinking a compound having an average molecular weight of 1,000 to 20,000 and having a structure of the following formula (1);

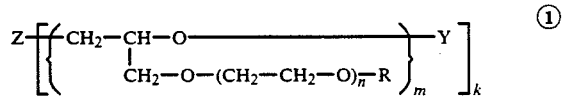

in which Z is a residue of a compound having at least one active hydrogen, Y is a hydrogen atom or polymerizable functional group, m is an integer of 1 to 250, n is 0 or an integer of 1 to 25, k is an integer of 1 to 12, R is an alkyl, aklenyl, aryl or alkylaryl group having 1 to 20 carbon atoms. While the compound represented by the formula (1) in which Y is a hydrogen atom may be crosslinked with a crosslinking agent such as an isocyanate compound, the compound having a structure of the formula (1) in which Y is a polymerizable functional group may be crosslinked by itself.

2 Claims, 1 Drawing Sheet

ION-CONDUCTIVE POLYMER ELECTROLYTE

BACKGROUND OF THE INVENTION

This invention relates to an ion-conductive polymer electrolyte.

As an ion-conductive polymer electrolyte, there has been known following compounds. For example, an organic polymer electrolyte of polyethylene oxide type; an organic polymer electrolyte having a multifunctional polyether molecular structure prepared by a random copolymerization of ethylene oxide portion and propylene oxide portion (Japanese Patent Publication No. 249,361 of 1987); an ion-conductive polymer electrolyte comprising a branched polyethylene oxide prepared by adding ethylene oxide as the side chain to a main chain of polyethylene oxide (Japanese Patent Publication No. 136,408 of 1988); a solid polymer electrolyte comprising an ethylene oxide copolymer containing an ionic compound in dissolved state (Japanese Laid-Open Patent Publication No. 83,249 of 1986); and an ion-conductive polymer electrolyte in which a high polymer solid substance having plasticity is further constituted substantially with a branched-chain of a homopolymer or copolymer which is thermoplastic and has no cross linkage (Japanese Laid-Open Patent Publication No. 98,480 of 1980).

However, those conventional ion-conductive polymer electrolytes have the following problems.

First, the organic polymer electrolyte of polyethylene oxide type shows a relatively good lithium-ion conductivity in the temperature range not lower than 40° C., but the characteristic is lowered rapidly at the room temperature range of about 25° C. Accordingly, it is very difficult to use the electrolyte for various applications such as battery, electrochromic and the like.

The organic polymer electrolytes described in Japanese Patent Publication No. 249,361 of 1987 and Japanese Patent Publication No. 136,408 of 1988 do not show rapid lowering of the lithium-ion conductivity at the room temperature range of about 25° C., but the lowering proceeds at a temperature of not higher than 0° C. which is considered as a practical temperature range. Therefore, a practical ion-conductivity can not be obtained.

The organic polymer electrolyte described in Japanese Laid-Open Patent Publication No. 83,249 of 1986 is an organic polymer prepared by a randam-copolymerization of ethylene oxide with the other monomer. The structure of the organic polymer resultantly becomes amorphous as a result by the random-copolymerization, but the amorphous structure is not sufficient by the difference of reactivity between each monomers so that the product quality tends to be unstable.

Further, since the organic polymer electrolyte described in Japanese Laid-Open Patent Publication No. 98,480 of 1980 is thermoplastic, a film formed with it is limited only to be simple and a good adhesion between the film and the electrode can not be obtained.

The object of the present invention is to solve such problems as described above and to provide an ion-conductive polymer electrolyte which shows an excellent ion conductivity and can be easily handled.

SUMMARY OF THE INVENTION

The ion-conductive polymer electrolyte according to the invention comprises an organic polymer and a soluble electrolyte salt. The organic polymer is obtained by crosslinking a compound having an average molecular weight of 1,000 to 20,000 and having a structure of the following formula ①;

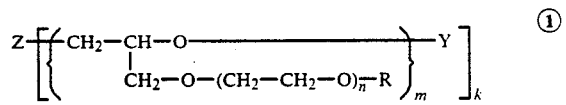

in which Z is a residue of a compound having at least one active hydrogen (hereinafter referred to as "active hydrogen compound"), Y is a hydrogen atom or polymerizable functional group, m is an integer of 1 to 250, n is 0 or an integer of 1 to 25, k is an integer of 1 to 12, R is an alkyl, alkenyl, aryl or alkylaryl group having 1 to 20 carbon atoms.

While the compound having a structure of the formula ① in which Y is a hydrogen atom may be crosslinked with a crosslinking agent such as an isocyanate compound, the compound having a structure of the formula ① in which Y is a polymerizable functional group may be crosslinked by itself.

DETAILED DESCRIPTION OF THE INVENTION

Thus, the ion-conductive polymer electrolyte according to the invention is characterized in comprising an organic polymer prepared by crosslinking the specific compound having a structure of the formula ① and a soluble electrolyte salt.

The compound having a structure of the formula ① wherein Y is a hydrogen atom can be obtained by reacting an active hydrogen compound with glycidyl ethers in the presence of a catalyst so that the molecular weight of the reaction product becomes 1,000 to 20,000, that is, m in the formula ① becomes 1 to 250.

As the active hydrogen compounds, there are exemplified the following compounds; such as polyhydric alcohols, e.g., ethylene glycol, propylene glycol, 1,4-butanediol, glycerol, trimethylolpropane, pentaerythritol, sorbitol, sucrose, polyglycerol and the like; amine compounds, e.g., butylamine, 2-ethylhexylamine, ethylenediamine, hexamethylenediamine, diethylenetriamine, triethylenetetramine, tetraethylenepentamine, pentaethylenehexamine, aniline, benzylamine, phenylenediamine and the like; phenolic active hydrogen compounds, e.g., Bisphenol A, hydroquinone, novolac and the like; compounds having different active hydrogen-containing groups in the molecule, e.g., monoethanolamine, diethanolamine and the like. Among them, polyhydric alcohols are particularly preferred.

Next, as the glycidyl ethers to be reacted with the active hydrogen compounds, there are exemplified the following compounds; such as methyl glycidyl ether, ethyl glycidyl ether or alkyl-, alkenyl-, aryl- or alkylaryl-polyethylene glycol glycidyl ethers represented by the following formula;

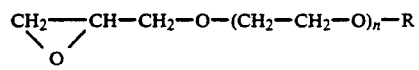

wherein R is a straight-chain alkyl such as methyl, ethyl, butyl and the like; branched alkyl such as isopropyl, sec-butyl, tert-butyl and the like; alkenyl such as vinyl, allyl, 1-propenyl, 1,3-butadienyl and the like; aryl or alkylaryl such as phenyl, nonylphenyl, tolyl, benzyl and the like and n is an integer of 1 to 25. In the above formula, n is preferably an integer of 1 to 15 and the carbon number of R is preferably 1 to 12.

The glycidyl ethers may be copolymerized with alkylene oxides such as ethylene oxide, propylene oxide and the like within the range in which the characteristics of the organic polymer are not changed.

Generally, the following catalysts may be used in the reaction of active hydrogen compounds with glycidyl ethers. There are included basic catalysts such as sodium methylate, sodium hydroxide, potassium hydroxide, lithium carbonate and the like; acidic catalysts such as boron trifluoride and the like; amine catalysts such as trimethylamine, triethylamine and the like.

Furthermore, the compound having a structure of the formula ① wherein Y is a polymerizable functional group may be obtained by a method in which an active hydrogen compound is reacted with glycidyl ethers to obtain a polyether compound as described above and then, if necessary, a polymerizable functional group is introduced to the end of the main chain of the polyether compound.

Among the polymerizable functional groups, there are included an alkenyl such as vinyl and the like; an group having an unsaturated bond such as acryloyl, methacryloyl and the like; an group having straight chain and cyclic portion containing Si and the like. These groups are introduced into the molecule by reacting the above polyether compound with a compound having the polymerizable functional group.

As the compound having the polymerizable functional group, there are exemplified the following compounds; such as compounds having at least one carboxyl group and at least one unsaturated bond in the molecule, e.g., acrylic acid, methacrylic acid, cinnamic acid, maleic acid, fumaric acid, itaconic acid, p-vinyl benzoic acid and the like; and/or anhydrides of the above compounds, e.g., maleic anhydride, itaconic anhydride and the like; and/or acid chlorides of the above compounds; glycidyls, e.g., allyl glycidyl ether, glycidyl methacrylate and the like; isocyanates, e.g., methacryloyl isocyanate and the like; the compounds containing Si, e.g., dichlorosilane, dimethyl vinylchlorosilane and the like. These compounds having the polymerizable functional group may be used solely or in combination to produce the polymerizable compound having a structure of the formula ①.

The compounds having a structure of the formula ① thus prepared may be used solely or in combination. However, it is important that the compound having an average molecular weight of 1,000 to 20,000 is used in any event. When the average molecular weight is less than 1,000, the film-formability of the product becomes poor, and when the average molecular weight is more than 20,000, the physical property of the film becomes bad.

In the organic compounds having a structure of the formula ①, k corresponds to the number of active hydrogen groups in the active hydrogen compound used as the starting material and is an integer of 1 to 12.

The crosslinking reaction of the compound having a structure of the formula ① wherein Y is a hydrogen atom may be carried out by using as a crosslinking agent at least one polyisocyanate compound such as 2,4-tolylene diisocyanate (2,4-TDI), 2,6-tolylene diisocyanate (2,6-TDI), 4,4'-diphenylmethane diisocyanate (MDI), hexamethylene diisocyanate (HMDI), isophorone diisocyanate, triphenylmethane triisocyanate, tris (isocyanatephenyl) thiophosphate, lysine ester triisocyanate, 1,8-diisocyanate-4-isocyanatemethyloctane, 1,6,11-undecane triisocyanate, 1,3,6-hexamethylene triisocyanate, bicycloheptane triisocyanate, biuret-bonded HMDI, isocyanurate-bonded HMDI, an adduct of trimethylolpropane with 3 moles of TDI and the like.

The used amount of the crosslinking agent is preferably selected so that the number of isocyanate group in the crosslinking agent becomes 1 to 1.5 times of the number of hydroxyl group in the compound having a structure of the formula ①.

Further, to complete rapidly the crosslinking reaction, it is preferred to use a catalyst. Among the catalysts, there are included such as organic metal catalysts, e.g. dibutyltin dilaurate (DBTDL), dibutyltin diacetate (DBTA), salt of phenyl mercury propionic acid, lead octenate and the like; amine catalysts, e.g., triethylenediamine, N,N'-dimethylpiperazine, N-methylmorpholine, tetramethyl guanidine, triethylamine and the like.

Next, the crosslinking reaction of the compound having a structure of the formula ① wherein Y is a polymerizable functional group may be different depending on the nature of the structure and the type of the polymerizable functional group. However, the reaction may be carried out with the use of available means for film-forming such as heat, light and electronic ray. If necessary, a polymerization initiator and/or a sensitizer may be added in the reaction system.

As the soluble electrolyte salt doped into the organic polymer after the crosslinking reaction, there are exemplified the following compounds; such as inorganic-ion salts containing at least one metal element selected from the group consisting of Li, Na, K, Cs, Ag, Cu and Mg, e.g., LiI, LiCl, LiClO$_4$, LiSCN, LiBF$_4$, LiAsF$_6$, LiCF$_3$SO$_3$, LiC$_6$F$_{13}$SO$_3$, LiCF$_3$CO$_2$, LiHgI$_3$, NaI, NaSCN, NaBr, KI, CsSCN, AgNO$_3$, CuC$_{12}$Mg(ClO$_4$)$_2$ and the like; organic-ion salts, e.g., lithium stearylsulfate, sodium octylsulfate, lithium dodecylbenzenesulfate, sodium naphthalenesulfate, lithium dibutylnaphthalenesulfate, potassium octylnaphthalenesulfate, potassium dodecylnaphthalenesulfate and the like.

The added mol ratio of the soluble electrolyte salt to the number of oxyethylene unit (hereinafter referred to as "EO") comprised in the above organic polymer is preferably 0.0001~5.0 (mol/EO). When the soluble electrolyte salt is added in too high ratio, excess of the soluble electrolyte salt such as inorganic-ion salt does not dissociate but merely is present as a mixture and resultantly the ionic conductivity is adversely lowered.

The soluble electrotyle salts may be used solely or in combination. The method for doping is also not restricted but it is generally convenient that the salts are dissolved in an organic solvent such as methyl ethyl ketone (MEK), tetrahydrofuran (THF) and the like and mixed with the organic polymers uniformly and then the organic solvent is removed under reduced pressure.

According to the invention, as a glycidyl ether is used in the constitution of the main chain of the organic polymer, the structure of the organic polymer is made to be amorphous completely and the crystallization temperature is lowered by the presence of the side chain similar to the main-chain. When a lithium salt is used as the soluble electrolyte salt, the movement of the lithium cation is made easy and lithium-ion conductivity in a temperature range not higher than room temperature is remarkably improved.

When an active hydrogen compound is crosslinked with a crosslinking agent such as polyisocyanate and the like, a film superior in both of curability and adhesion to the electrode can be obtained and thus an ion-conductive polymer electrolyte excellent in practical utility can be provided. On the other hand, when a compound having a polymerizable functional group in the molecular is used, no crosslinking agent is required to carry out the crosslinking reaction.

Accordingly it is safe and it can shorten the crosslinking time.

Furthermore, according to the invention, the organic polymer can be made more amorphous to give various forms of the product and accordingly it is very useful.

PREFERRED EMBODIMENTS OF THE INVENTION

Figure 1:
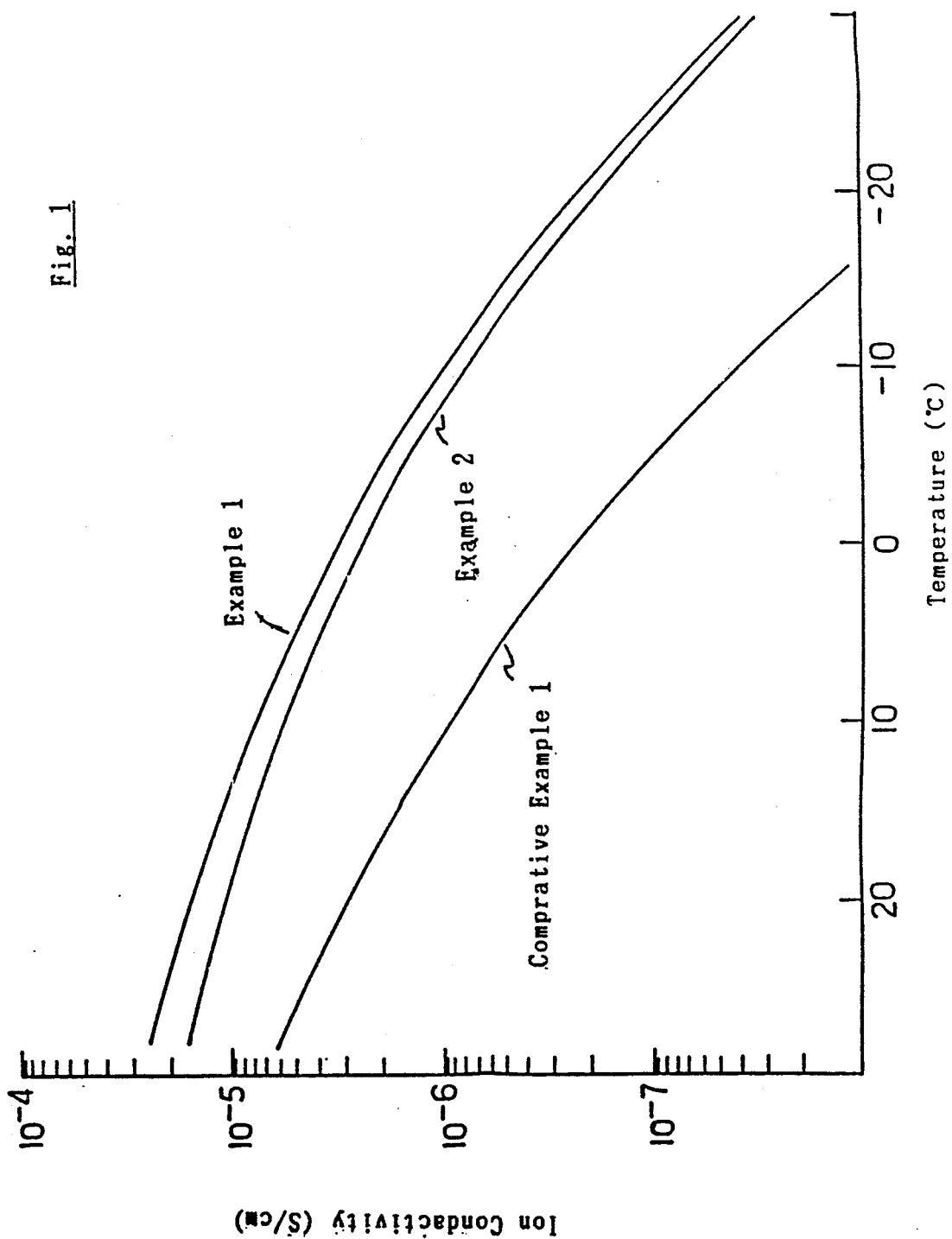
FIG. 1 is a graph illustrating the relationship between the temperature and the ion conductivity of the ion-conductive polymer electrolytes obtained in the aftermentioned Example 1, Example 2 and Comparative Example 1.

The following examples serve to illustrate the invention in more detail although the invention is not limited to the examples. Unless otherwise indicated, % signifies % by weight.

EXAMPLE 1

1 mol of glycerol (92 g) was reacted with 22 mol of methyldiethylene glycol glycidyl ether (3,874 g) represented by the following formula

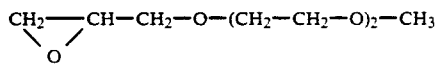

in the presence of 0.15 mol of potassium hydroxide (8.4 g) for 6 hours at 120° C. with a consecutive-introducing method and the reaction was further continued at the same temperature for 2 hours. Then the product was purified to obtain 3,570 g of an organic compound having an average molecular weight of 4,900 (calculated by hydroxide value) and a structure of the formula ① in which

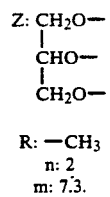

R: —CH$_3$
n: 2
m: 7.3.

3.6 g of thus obtained organic compound, 0.12 g of LiClO$_4$, the 1.5 equivalent weight of tolylene diisocyanate to the above organic compound and 0.01 g of dibutyltin dilaurate were dissolved in 3 ml of methyl ethyl ketone and then the mixture was poured into a flat vessel and allowed to stand for 30 minutes at 60° C. under atmospheric pressure in a stream of nitrogen gas. Then the solution was heat-treated for 8 hours at 80° C. in vacuum degree of below $1 \times 10^{-3}$ Torr to remove methyl ethyl ketone, resultantly an ion-conductive polymer electrolyte having a thickness of 50 μm was obtained.

EXAMPLE 2

An ion-conductive polymer electrolyte was obtained in the same manner as in Example 1 except that the usage amount of LiClO$_4$ was changed to 0.06 g.

EXAMPLE 3

30 g of ethylene glycol was reacted with 1,910 g of n-butyl-triethylene glycol glycidyl ether represented by the following formula

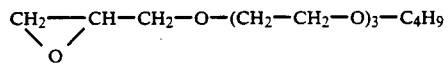

in the presence of 6.8 g of potassium hydroxide for 6 hours at 120° C. with a consecutive-introducing method and further the reaction was continued at the same temperature for 2 hours. The produce was purified to obtain 2,094 g of an organic compound having an average molecular weight of 3,950 and a structure of the formula ① in which

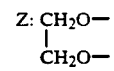

R: —C$_4$H$_9$
n: 3
m: 7.5

3.6 g of thus obtained organic compound, 0.12 g of LiClO$_4$, the 0.7 equivalent weight of biuret-bonded HMDI to the above organic compound and 0.01 g of dibutyltin dilaurate were dissolved in 3 ml of methyl ethyl ketone and then the mixture was poured into a flat vessel and allowed to stand for 30 minutes at 60° C. under atmospheric pressure in a stream of nitrogen gas. Then the solution was heat-treated for 8 hours at 80° C. in vacuum degree of below $1 \times 10^{-3}$ Torr to remove methyl ethyl ketone, resultantly an ion-conductive polymer electrolyte having a thickness of 50 μm was obtained.

EXAMPLE 4

20 g of ethylenediamine was reacted with 2,650 g of phenylhexaethylene glycol glycidyl ether represented by the following formula

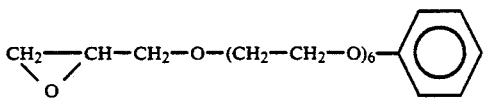

in the presence of 9.4 g of potassium hydroxide for 6 hours at 120° C. with a consecutive-introducing method and the reaction was further continued at the same temperature for 2 hours. Then the produce was purified to obtain 2,360 g of an organic compound having an average molecular weight of 7,870 and a structure of the formula ① in which Z: 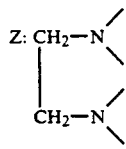

R: 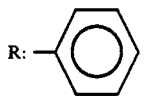

n: 6
m: 4.8.

3.6 g of thus obtained organic compound, 0.12 g of LiClO$_4$, the 1.5 equivalent weight of MDI to the above organic compound and 0.01 g of dibutyltin dilaurate were dissolved in 3 ml of methyl ethyl ketone and then the mixture was poured into a flat vessel and allowed to stand for 30 minutes at 60° C. under atmospheric pressure in a stream of nitrogen gas. Then the solution was heat-treated for 8 hours at 80° C. in vacuum degree of below $1 \times 10^{-3}$ Torr to remove methyl ethyl ketone, resultantly an ion-conductive polymer electrolyte having a thickness of 50 μm was obtained.

Example 5

30 g of pentaethylenehexamine was reacted with 1,920 g of methyltriethylene glycol glycidyl ether represented by the following formula

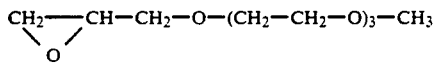

in the presence of 6.9 g of potassium hydroxide for 6 hours at 120° C. with a consecutive-introducing method and the reaction was further continued at the same temperature for 2 hours. Then the product was purified to obtain 1,598 g of an organic compound having an average molecular weight of 13,660 and a structure of the formula ① in which

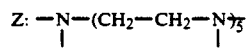

R: —CH$_3$
n: 3
m: 8.4.

3.6 g of thus obtained organic compound 0.12 g of LiClO$_4$, the 1.5 equivalent weight of tolylene diisocyanate to the above organic compound and 0.01 g of dibutyltin dilaurate were dissolved in 3 ml of methyl ethyl ketone and then the mixture was poured into a flat vessel and allowed to stand for 30 minutes at 60° C. under atmospheric pressure in a stream of nitrogen gas. Then the solution was heat-treated for 8 hours at 80° C. in vacuum degree of below $1 \times 10^{-3}$ Torr to remove methyl ethyl ketone, resultantly an ion-conductive polymer electrolyte having a thickness of 50 μm was obtained.

EXAMPLE 6

20 g of Bisphenol A was reacted with 1,140 g of methyldodecaethylene glycol glycidyl ether represented by the following formula

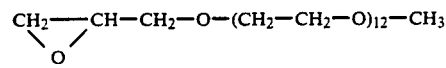

in the presence of 4.19 g of potassium hydroxide for 6 hours at 120° C. with a consecutive-introducing method and the reaction was further continued at the same temperature for 2 hours. Then the product was purified to obtain 1,060 g of an organic compound having an average molecular weight of 12,710 and a structure of the formula ① in which

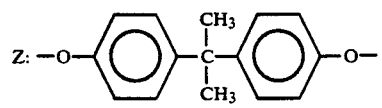

R: —CH$_3$
n: 12
m: 10.

3.6 g of thus obtained organic compound, 0.12 g of LiClO$_4$, the 0.7 equivalent weight of biuret-bonded HMDI to the above organic compound and 0.01 g of dibutyltin dilaurate were dissolved in 3 ml of methyl ethyl ketone and then the mixture was poured into a flat vessel and allowed to stand for 30 minutes at 60° C. under atmospheric pressure in a stream of nitrogen gas. Then the solution was heat-treated for 8 hours at 80° C. in vacuum degree of below $1 \times 10^{-3}$ Torr to remove methyl ethyl ketone, resultantly an ion-conductive polymer electrolyte having a thickness of 50 μm was obtained.

EXAMPLE 7

20 g of monoethanolamine was reacted with 1,630 g of phenyldiethylene glycol glycidyl ether represented by the following formula

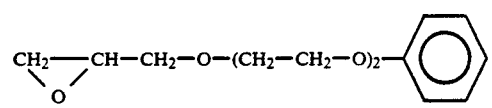

in the presence of 5.8 g of potassium hydroxide for 6 hours at 120° C. with a consecutive-introducing method and the reaction was further continued at the same temperature for 2 hours. Then the produce was purified to obtain 1,430 g of an organic compound having an average molecular weight of 4,830 and a structure of the formula ① in which Z: 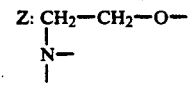

R: 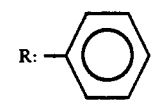

-continued
n: 2
m: 7.

3.6 g of thus obtained organic compound, 0.12 g of LiClO$_4$, the 1.5 equivalent weight of tolylene diisicyanate to the above organic compound and 0.01 g of dibutyltin dilaurate were dissolved in 3 ml of methyl ethyl ketone and then the mixture was poured into a flat vessel and allowed to stand for 30 minutes at 60° C. under atmospheric pressure in a stream of nitrogen gas. Then the solution was heat-treated for 8 hours at 80° C. in vacuum degree of below $1\times10^{-3}$ Torr to remove methyl ethyl ketone, resultantly an ion-conductive polymer electrolyte having a thickness of 50 μm was obtained.

COMPARATIVE EXAMPLE 1

An ion-conductive polymer electrolyte was obtained in the same manner as in Example 1 except that 3.6 g of a random polyether (ethylene oxide/propylene oxide=8/2) having an average molecular weight of 3,000 was used instead of 3.6 g of the organic polymer used in Example 1 and 0.2 g of LiClO$_4$ was used instead of 0.12 g of LiClO$_4$.

Litium-ion conductivity test

Each of the ion-conductive polymer electrolytes obtained in Examples 1 to 7 and Comparative Example 2 was interposed between platinum electrodes and the alternating current impedance between electrodes was measured and the complex impedance was analyzed. The results are shown in following Table 1.

Further, the same results are shown in FIG. 1 with respect to Examples 1 and 2, and Comparative Example 1.

TABLE 1

| | Ionic conductivity (S/cm) | | |
|---|---|---|---|
| | 20° C. | 0° C. | −20° C. |
| Example 1 | $1.8 \times 10^{-5}$ | $3.5 \times 10^{-6}$ | $2.6 \times 10^{-7}$ |
| 2 | $1.3 \times 10^{-5}$ | $2.8 \times 10^{-6}$ | $2.0 \times 10^{-7}$ |
| 3 | $1.0 \times 10^{-5}$ | $2.2 \times 10^{-6}$ | $1.8 \times 10^{-7}$ |
| 4 | $2.8 \times 10^{-5}$ | $4.2 \times 10^{-6}$ | $3.1 \times 10^{-7}$ |
| 5 | $2.1 \times 10^{-5}$ | $3.8 \times 10^{-6}$ | $2.9 \times 10^{-7}$ |
| 6 | $2.5 \times 10^{-5}$ | $4.0 \times 10^{-6}$ | $3.0 \times 10^{-7}$ |
| 7 | $1.8 \times 10^{-5}$ | $3.6 \times 10^{-6}$ | $2.6 \times 10^{-7}$ |
| Comparative Example 1 | $3.0 \times 10^{-6}$ | $2.3 \times 10^{-7}$ | below $1.0 \times 10^{-8}$ |

From the result described in Table 1, the lithium-ion conductivity according to the present invention is superior to that in Comparative Example 1 and its superiority becomes remarkable with lowering temperature. And it is obvious that the higher lithium-ion conductivity is shown even if the doping amount of the soluble salt of electrolyte such as LiClO$_4$ and the like is small. The ion-conductive polymer electrolyte according to the present invention has high practical superiority in this respect.

EXAMPLE 8

18 g of glycerol was reacted with 990 g of methyl-diethylene glycol glycidyl ether represented by the following formula

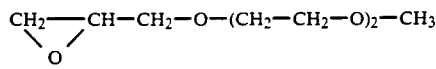

in the presence of a catalyst (2 g of potassium hydroxide). The product was purified with desalting to obtain 876 g of polyether having an average molecular weight of 4,890 (calculated by hydroxide value).

The polyether and the 1.1 equivalent weight of acrylic acid to the hydroxide number of the polyether were added to benzene the used amount of which is equivalent with that of the acrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-acrylated polyether having a molecular weight of 5,053 and a structure of the formula ①, in which

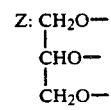

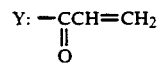

m: 9
n: 2
R: —CH$_3$
k: 3, was confirmed by measuring the bromine value and the saponification value.

3.6 g of thus obtained terminal-acrylated polyether, 0.13 g of LiSCN (0.025 mol/EO) and 1% of a polymerization initiator (2,2'-azoisobutylonitrile) were dissolved in 3 ml of methyl ethyl ketone and allowed to stand for 1 hours at 80° C. in a stream of nitrogen gas under atmospheric pressure. Then the solution was heat-treated for 8 hours at the same temperature in vacuum degree of below $1\times10^{-3}$ Torr to remove methyl ethyl ketone, and resultantly an ion-conductive polymer electrolyte having a thickness of 48 μm was obtained.

EXAMPLE 9

20 g of sorbitol was reacted with 1,320 g of methyl-triethylene glycol glycidyl ether represented by the following formula

| Abbreviations | |
|---|---|
| min | minute(s) |
| h | hour(s) |
| DIPEA | N,N-diisopropylethylamine (or more commonly as diisopropylethylamine) |
| THF | tetrahydrofuran |
| Ph or φ | phenyl |
| THP | tetrahydropyran |
| PNB | p-nitrobenzyl |
| Pd/C | palladium on carbon |
| ether | diethyl ether |
| DMF | dimethylformamide |
| trityl or Tr | triphenylmethyl |
| DMAP | 4-dimethylaminopyridine |

| Abbreviations | |
|---|---|
| psi | pounds per square inch |
| eq. | equivalent(s) |
| Ar | aryl |
| R.T. or rt | room temperature | in the presence of a catalyst (2.7 g of potassium hydroxide). The product was purified with desalting to obtain 954 g of a polyether having an average molecular weight of 11,760 (calculated by hydroxide value).

The polyether and the 1.1 equivalent weight of methacrylic acid to the hydroxide number of the polyether were added to benzene the used amount of which is identical with that of the methacrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-acrylated polyether having an average molecular weight of 12,173 and a structure of the formula ①, in which

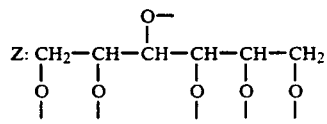

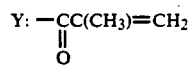

m: 9
n: 3
R: —CH$_3$
k: 6, was confirmed by measuring the bromine value and the saponification value.

3.6 g of thus obtained terminal-methacrylated polyether, 0.12 g of LiClO$_4$ (0.01 mol/EO) and 1% of a polymerization initiator (2,2'-azoisobutylonitrile) were dissolved in 3 ml of methyl ethyl ketone and allowed to stand for 1 hour at 80° C. in a stream of nitrogen gas under atmospheric pressure. Then the solution was heat-treated for 8 hours at the same temperature in vacuum degree of below 1×10$^{-3}$ Torr to remove methyl ethyl ketone, and resultantly an ion-conductive polymer electrolyte having a thickness of 48 μm was obtained.

EXAMPLE 10

15 g of glycerol was reacted with 2,650 g of methylhexaethylene glycol glycidyl ether represented by the following formula

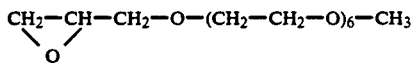

in the presence of a catalyst (5 g of potassium hydroxide). The product was purified with desalting to obtain 2,160 g of a polyether having an average molecular weight of 15,260 (calculated by hydroxide value).

The polyether and the 1.1 equivalent weight of acrylic acid to the hydroxide number of the polyether were added to benzene the used amount of which is identical with that the acrylic acid. The mixture was reacted by adding 0.01 mol % of sulfuric acid at a temperature of 80° to 90° C. with introducing air. The completion of the reaction was confirmed by measuign the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-acrylated polyether having a molecular weight of 15,422 and a structure of the formula ①, in which

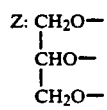

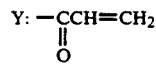

m: 14
n: 6
R: —CH$_3$
k: 3, was confirmed by measuring the bromine value and the saponification value.

3.6 g of the terminal acrylate polyether obtained above, 0.14 g of LiClO$_4$ (0.022 mol/EO) and 1% of polymerization initiator (2,2'-azoisobutylonitrile) were dissolved in 3 ml of methyl ethyl ketone and allowed to stand for one hour at 80° C. in a stream of nitrogen gas under atmospheric pressure. Then the solution was heat-treated for 8 hours at the same temperature in vacuum degree of below 1×10$^{-3}$ Torr to remove methyl ethyl ketone, resultantly an ion-conductive polymer electlyte having a thickness of 45 μm was obtained.

EXAMPLE 11

20 g of monoethanolamine was reacted with 1,630 g of phenyldiethylene glycol glycidyl ether represented by the following formula

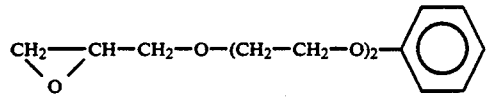

in the presence of a catalyst (5.8 g of potassium hydroxide). Then the product was purified with desalting to obtain 1,430 g of a polyether having an average molecular weight of 4,830 (calculated by hydroxide value).

The polyether and the 1.1 equivalent weight of acrylic acid to the hydroxide number of the polyether were added to benzene the used amount of which is identical with that of the acrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate, and then benzene was removed under reduced pressure. Resultantly, the formation of a terminal-acrylated polyether having an average molecular weight of 4,990 and a structure of the formula ①, in which

Z: CH$_2$—CH$_2$—O—
 |
 N—
 |

Y: —CCH=CH$_2$
   ‖
   O m: 7
n: 2

R: 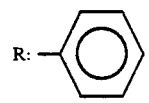

k: 3, was confirmed by measuring the bromine value and the saponification value.

3.6 g of thus obtained terminal-acrylated polyether, 0.11 g of NaClO$_4$ (0.015 mol/EO) and 1% of a polymerization initiator (2,2'-azoisobutylonitrile) were dissolved in 3 ml of methyl ethyl ketone and allowed to stand for one hour at 80° C. in a stream of nitrogen gas under atmospheric pressure. Then the solution was heat-treated for 8 hours at the same temperature in vacuum degree of below 1×10$^{-3}$ Torr to remove methyl ethyl ketone and resultantly an ion-conductive polymer electrolyte having a thickness of 45 μm was obtained.

EXAMPLE 12

20 g of Bisphenol A was reacted with 1,140 g of methyldodecaethylene glycol glycidyl ether represented by the following formula

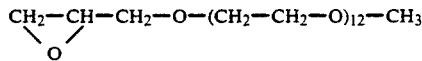

in the presence of a catalyst (4.2 g of potassium hydroxide) and the product was purified with desalting to obtain 1,060 g of a polyether having a molecular weight of 12,710 (calculated by hydroxide value).

The polyether and the 1.1 equivalent weight of p-vinylbenzoic acid to the hydroxide number of the polyether were added to benzene the used amount of which is identical with that the p-vinylbenzoic acid. The mixture was reacted by adding 0.01% of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a polyether having p-vinylbenzoate bond at terminal and having a molecular weight of 12,970 and a structure of the formula ①, in which Z: 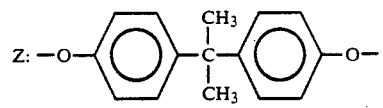

Y: 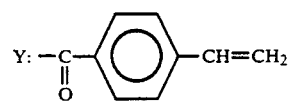

m: 10
n: 12
R: —CH$_3$
k: 2, was confirmed by measuring the bromine value and the saponification value.

3.6 g of thus obtained polyether having p-vinylbenzoate bond, 0.10 g of NaSCN (0.015 mol/EO) and 1% of a polymerization initiator (2,2'-azoisobutylonitrile) were dissolved in 3 ml of methyl ethyl ketone and allowed to stand for one hour at 80° C. in a stream of nitrogen gas under atmospheric pressure. Then the solution was heat-treated for 8 hours at the same temperature in vacuum degree of below 1×10$^{-3}$ Torr to remove methyl ethyl ketone and resultantly an ion-conductive polymer electrolyte having a thickness of 42 μm was obtained.

EXAMPLE 13

20 g of ethylenediamine was reacted with 2,650 g of phenylhexaethylene glycol glycidyl ether represented by the following formula

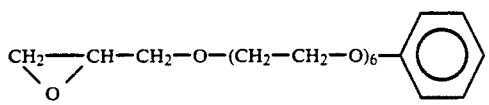

in the presence of a catalyst (9.4 g of potassium hydroxide). The product was purified with desalting to obtain 2,360 g of a polyether having a molecular weight of 7,870 (calculated by hydroxide value).

The polyether and the 1.1 equivalent weith of acrylic acid to the hydroxide number of the polyether were added to benzene the used amount of which is identical with that of the acrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of the terminal-acrylated polyether having a molecular weight of 8,084 and a structure of the formula ①, in which

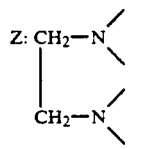

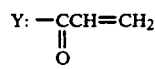

m: 5
n: 6

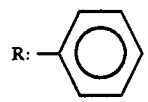

k: 4, was confirmed by measuring the bromine value and the saponification value.

3.6 g of thus obtained terminal acrylate polyether, 0.09 g of LiSCN (0.020 mol/EO) and 1% of a polymerization initiator (2,2'-azoisobutylonitrile) were dissolved in 3 ml of methyl ethyl ketone and allowed to stand for one hour at 80° C. in a stream of nitrogen gas under atmospheric pressure. Then the solution was heat-treated for 8 hours at the same temperature in vacuum degree of below $1 \times 10^{-3}$ Torr to remove methyl ethyl ketone, and resultantly an ion-conductive polymer electrolyte having a thickness of 41 μm was obtained.

EXAMPLE 14

30 g of ethylene glycol was reacted with 2,650 g of n-butyl triethylene glycol glycidyl ether represented by the following formula

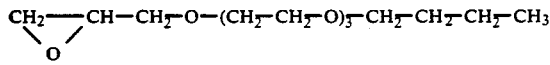

in the presence of a catalyst (6.8 g of potassium hydroxide). The product was purified with desalting to obtain 2,094 g of a polyether having an average molecular weight of 3,950 (calculated by hydroxide value).

The polyether and the 1.1 equivalent weight of p-vinylbenzoic acid to the hydroxide number of the polyether were added to benzene the used amount of which is identical with that of the p-vinylbenzoic acid and the mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a polyether having p-vinylbenzoate bond at terminal and having an average molecular weight of 4,213 and a structure of the formula ①, in which

Z: —O—CH$_2$—CH$_2$—O—

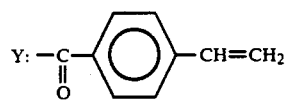

m: 7
m: 3
R: —CH$_2$—CH$_2$—CH$_2$—CH$_3$
k: 2, was confirmed by measuring the bromine value and the saponification value.

3.6 g of thus obtained polyether having p-vinylbenzoate bond at terminal, 0.10 g of LiClO$_4$ (0.015 mol/EO) and 1% of a polymerization initiator (2,2'-azoisobutylonitrile) were dissolved in 3 ml of methyl ethyl ketone and allowed to stand for one hour at 80° C. in a stream of nitrogen gas under atmospheric pressure. Then the solution was heat-treated for 8 hours at the same temperature in vacuum degree of below $1 \times 10^{-3}$ Torr to remove methyl ethyl ketone, and resultantly an ion-conductive polymer electrolyte having a thickness of 50 μm was obtained.

EXAMPLE 15

30 g of pentaethylenehexamine was reacted with 1,920 g of methyltriethylene glycol glycidyl ether represented by the following formula

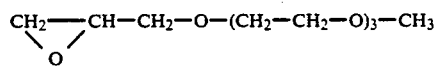

in the presence of a catalyst (6.9 g of potassium hydroxide). The product was purified with desalting to obtain 1,598 g of a polyether having an average molecular weight of 13.660 (calculated by hydroxide value).

The polyether and the 1.1 equivalent weight of methacrylic acid to the hydroxide number of the polyether were added to benzene the used amount of which is identical with that the p-vinylbenzoic acid. The mixture was reacted by adding 0.01 mol % of sulfuric acid at a temperature of 80° to 90° C. with introducing air. The completion of the reaction was confirmed by measuring the effluent amount of water and the acid value.

After completion of the reaction, the solution was neutralized with an aqueous solution of sodium hydroxide. The product was washed with a saturated aqueous solution of sodium sulfate and then benzene was removed under reduced pressure. Resultantly, the formation of the terminal-methacrylated polyether having an average molecular weight of 14,200 and a structure of the formula ①, in which

Z: —N—(CH$_2$—CH$_2$—N)$_5$—

Y: —CC(CH$_3$)=CH$_2$
       ‖
       O m: 8
n: 3
R: —CH$_3$
k: 8, was confirmed by measuring the bromine value and the saponification value.

3.6 g of thus obtained terminal-methacrylated polyether, 0.23 g of $LiClO_4$ (0.025 mol/EO) and 1% of a polymerization initiator (2,2′-azoisobutylonitrile) were dissolved in 3 ml of methyl ethyl ketone and allowed to stand for 1 hour at 80° C. in a stream of nitrogen gas under atmospheric pressure. Then the solution was heat-treated for 8 hours at the same temperature in vacuum degree of below $1 \times 10^{-3}$ Torr to remove methyl ethyl ketone, and resultantly an ion-conductive polymer electrolyte having a thickness of 45 μm was obtained.

EXAMPLE 16

20 g of ethylene glycol was reacted with 6,250 g of methyl glycidyl ether represented by the following formula

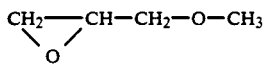

in the presence of a catalyst (10 g of potassium hydroxide). The product was purified with desalting to obtain 5,970 g of a polyether having an average molecular weight of 19,020 (calculated by hydroxide value).

The polyether and the 1.1 equivalent weight of acrylic acid to the hydroxide number of the polyether were added to benzene the used amount of which is identical with the acrylic acid. The mixture was reacted by adding 0.01 mol % of sulfuric acid at a temperature of 80° to 90° C. with introducing air. The completion of the reaction was confirmed by measuring the effluent amount of water and the acid value. After completion of the reaction, the solution was neutralized with an aqueous solution of sodium hydroxide. The product was washed with a saturated aqueous solution of sodium sulfate and then benzene was removed under reduced pressure. Resultantly, the formation of a terminal-acrylated polyether having an average molecular weight of 19,160 and a structure of the formula ①, in which

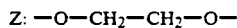

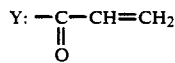

m: 108
n: 0
R: —$CH_3$
k: 2, was confirmed by measuring the bromine value and the saponification value.

3.6 g of thus obtained terminal-acrylated polyether, 0.13 g of $LiClO_4$ (0.015 mol/EO) and 1% of a polymerization initiator (2,2′-azoisobutylonitrile) were dissolved in 3 ml of methyl ethyl ketone and allowed to stand for 1 hour at 80° C. in a stream of nitrogen gas under atmospheric pressure. Then the solution was heat-treated for 8 hours at the same temperature in vacuum degree of below $1 \times 10^{-3}$ Torr to remove methyl ethyl ketone, and resultantly an ion-conductive polymer electrolyte having a thickness of 42 μm was obtained.

COMPARATIVE EXAMPLE 2

An ion-conductive polymer electrolyte was obtained in the same manner as in Example 1 except that a random ether (ethylene oxide/propylene oxide=8/2) having an average molecular weight of 3,000 was used instead of the polyether having an average molecular weight of 4,890 to produce the terminal-acrylated polyether, and 0.20 g of $LiClO_4$ was used instead of 0.13 g of LiSCN.

Litium-ion Conductivity Test

Each of the ion-conductive polymer electrolytes obtained in Example 8 to 16 and Comparative Example 2 was interposed between platinum electrodes and the alternating current impedance between electrodes was measured and the complex impedance was analyzed. The results are shown in following Table 2.

TABLE 2

|  | Ionic conductivity (S/cm) | | |
| --- | --- | --- | --- |
|  | 20° C. | 0° C. | −20° C. |
| Example 8 | $1.1 \times 10^{-5}$ | $2.0 \times 10^{-6}$ | $2.1 \times 10^{-7}$ |
| Example 9 | $2.5 \times 10^{-5}$ | $2.8 \times 10^{-6}$ | $3.0 \times 10^{-7}$ |
| Example 10 | $2.1 \times 10^{-5}$ | $2.5 \times 10^{-6}$ | $2.8 \times 10^{-7}$ |
| Example 11 | $2.2 \times 10^{-5}$ | $3.8 \times 10^{-6}$ | $2.7 \times 10^{-7}$ |
| Example 12 | $2.1 \times 10^{-5}$ | $3.7 \times 10^{-6}$ | $2.4 \times 10^{-7}$ |
| Example 13 | $1.8 \times 10^{-5}$ | $3.0 \times 10^{-6}$ | $1.9 \times 10^{-7}$ |
| Example 14 | $1.2 \times 10^{-5}$ | $2.3 \times 10^{-6}$ | $1.8 \times 10^{-7}$ |
| Example 15 | $2.1 \times 10^{-5}$ | $3.7 \times 10^{-6}$ | $3.0 \times 10^{-7}$ |
| Example 16 | $1.0 \times 10^{-5}$ | $2.3 \times 10^{-6}$ | $1.6 \times 10^{-7}$ |
| Comparative Example 2 | $2.5 \times 10^{-6}$ | $2.1 \times 10^{-7}$ | below $1.0 \times 10^{-8}$ |

From the result described in Table 2, it is found that the ionic conductivity of the ion-conductive polymer electrolyte according to the present invention is very excellent and its superiority becomes remarkable with lowering temperature and higher lithium-ion conductivity can be obtained by use of small doping amounts of the soluble salt of electrolyte having such as $LiClO_4$ and the like.

Effects of the Invention

The ion-conductive polymer electrolyte according to the present invention shows good ion-conductivity stably. And it can be taken in various forms since it can be made amorphous, therefore, it has very excellent practicality. Furthermore, the ion-conductive polymer electrolyte according to the present invention is superior in safetyness and can be available with good operation since it can be crosslinked without using a crosslinking agent.

What is claimed is:

1. An ion-conductive polymer electrolyte comprising an organic polymer and a soluble electrolyte salt, characterized in that said organic polymer is obtained by crosslinking a compound having an average molecular weight of 1,000 to 20,000 and having a structure of the following formula ①:

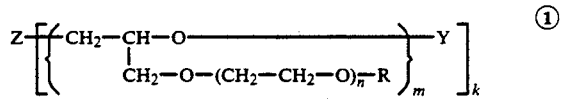

in which Z is a residue of polyalcohols, amine compounds, compounds having a phenolic active hydrogen or compounds having at least two different active hydrogens in a molecule, Y is

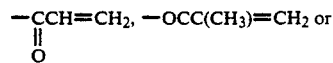

-continued

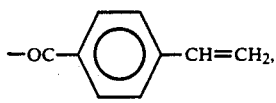

m is an integer of 1 to 250,
n is 0 or an integer of 1 to 25,
k is an integer of 1 to 12, and
R is an alkyl, alkenyl, aryl or alkylaryl group having 1 to 20 carbon atoms, said soluble electrolyte salt is at least one selected from the group consisting of inorganic-ion salts containing at least one metal element selected from the group consisting of Li, Na, K, Cs, Ag, Cu and Mg, and organic-ion salts consisting of lithium stearylsulfate, sodium octylsulfate, lithium dodecylbenzenesulfate, sodium naphthalenesulfate, lithium dibutyl-napthalenesulfate, potassium octylnapthalenesulfate, potassium dodecylnapthalenesulfate, and the added amount of said soluble electrolyte salt to an oxyethylene unit in said organic polymer is 0.0001~5.0 (mole/EO).

2. An ion-conductive polymer electrolyte comprising an organic polymer is obtained by crosslinking with at least one crosslinking agent selected from polyisocyanate compounds a compound having an average molecular weight of 1,000 to 20,000 and having a structure of the following formula (1):

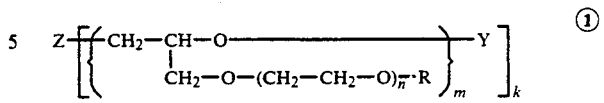

in which Z is a residue of polyalcohols, amine compounds, compounds having a phenolic active hydrogen or compounds having
at least two different active hydrogens in a molecule,
Y is hydrogen,
m is an integer of 1 to 250,
n is 0 or an integer of 1 to 25,
k is an integer of 1 to 12, and
R is an alkyl, alkenyl, aryl or alkylaryl group having 1 to 20 carbon atoms, said soluble electrolyte salt is at least one selected from the group consisting of inorganic-ion salts containing at least one metal element selected from the group consisting of Li, Na, K, Cs, Ag, Cu and Mg, and organic-ion salts consisting of lithium stearylsulfate, sodium octylsulfate, lithium dodecylbenzenesulfate, sodium naphthalenesulfate, lithium dibutyl-napthalenesulfate, potassium octylnapthalenesulfate, potassium dodecylnapthalenesulfate, and the added amount of said soluble electrolyte salt to an oxyethylene unit in said organic polymer is 0.0001~5.0 (mole/EO).

* * * * *